US 8,303,147 B2

(12) United States Patent
Jeon

(10) Patent No.: US 8,303,147 B2
(45) Date of Patent: Nov. 6, 2012

(54) LUMINOUS GARNISH FOR VEHICLE

(75) Inventor: Ho Tak Jeon, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 122 days.

(21) Appl. No.: 12/953,296

(22) Filed: Nov. 23, 2010

(65) Prior Publication Data
US 2012/0074725 A1 Mar. 29, 2012

(30) Foreign Application Priority Data

Sep. 28, 2010 (KR) .................. 10-2010-0093957

(51) Int. Cl.
*B60Q 1/56* (2006.01)
*F21V 8/00* (2006.01)
(52) U.S. Cl. ................. 362/501; 362/511; 362/540
(58) Field of Classification Search .......... 362/501, 362/509, 511, 540
See application file for complete search history.

(56) References Cited

U.S. PATENT DOCUMENTS

| 4,494,326 | A | * | 1/1985 | Kanamori | 40/593 |
| 4,965,950 | A | * | 10/1990 | Yamada | 40/546 |
| 6,604,834 | B2 | | 8/2003 | Kalana | |
| 7,901,120 | B2 | * | 3/2011 | Droste et al. | 362/509 |
| 8,016,467 | B2 | * | 9/2011 | Eberwein | 362/497 |
| 8,113,695 | B2 | * | 2/2012 | Meinke et al. | 362/351 |

FOREIGN PATENT DOCUMENTS

| JP | 08-281822 | 10/1996 |
| JP | 10-062626 | 3/1998 |
| JP | 2001-047936 | 2/2001 |
| JP | 2002-096680 | 4/2002 |
| JP | 2005-221661 | 8/2005 |
| KR | 1020040018023 | 3/2004 |
| KR | 100543167 | 1/2006 |
| KR | 1020060091091 | 8/2006 |
| KR | 100775392 | 11/2007 |
| KR | 1020090097037 | 9/2009 |
| KR | 1020100021196 | 2/2010 |

* cited by examiner

*Primary Examiner* — Peggy A. Neils
(74) *Attorney, Agent, or Firm* — Edwards Wildman Palmer LLP; Peter F. Corless

(57) ABSTRACT

The present invention relates to a luminous garnish for a vehicle in which an illumination unit and a light emitting unit forms an integral part, wherein the garnish provides various patterns and illuminations at a same portion of an integral part, thereby realizing the luxury and high product value of the interior material.

8 Claims, 5 Drawing Sheets

Prior Art (DURING THE DAY)   (AT NIGHT)

HEAT FILM   FORM FILM   PERFORM TRIMMING   INSERT FILM   PERFORM INSERT MOLDING   WITHDRAW PRODUCT

LUMINOUS GARNISH FOR VEHICLE

CROSS-REFERENCE TO RELATED APPLICATION

This application claims the benefit of Korean Patent Application No. 10-2010-0093957 filed Sep. 28, 2010, under 35 U.S.C. §119(a). The entire contents of the above-referenced application are incorporated herein by reference.

BACKGROUND (a) Technical Field

The present disclosure relates to a garnish for a vehicle. In one aspect, the invention relates to a luminous garnish that provides both a high quality and a high product value of a vehicular interior material by displaying various patterns and illuminations.

(b) Background Art

In recent years, there has been an increase in the development and sale of vehicles having an improved driving system (e.g., an improved engine), and enhanced convenience features (e.g., mounting various convenience devices).

High quality interior designs of vehicles are also being actively pursued and one method for increasing the quality of an interior of a vehicle is a garnish.

A garnish is one or more decorative parts attached to an instrument panel, a crash pad, a door console, and various trims, and generally has a wood grain film paper or a painted surface to provide patterns to an exterior of a surface.

Such garnishes help to decorate the interior of a vehicle to provide a novel and high quality interior. Additionally, luminous garnishes are being developed wherein illumination technologies are applied according to the specifications needed to achieve a certain high quality.

Although garnishes to which illumination technologies are applied are currently used only for some luxury cars or are available as options, the in-use demand of such garnishes is expected to expand regardless of the models of vehicles.

The illumination effect of a garnish is realized by light emitting from a light emitting body which creates a luxurious atmosphere in the interior of a vehicle.

A conventional garnish is produced by attaching a separate light emitting thin garnish structure for realizing an illumination effect, or by coupling a light emitting body, which is a separate part, to the garish, i.e. via a process of separately manufacturing a part (illumination part) in which a light emitting body is embedded and an actual garnish part (garnish body) and integrating them.

FIG. 1 is a sectional view illustrating an example of a conventional light emitting garnish which is disclosed in Korean Laid-Open Patent No. 2010-44443.

As shown in the figure, after an illumination unit 30 including a lamp 31, a lens 33, a half mirror layer 34, and a light transmitting layer 34a, and a garnish body (decoration part) 20 are manufactured separately, they are mounted to a part such as an instrument panel such that they are integrated with each other.

According to the above-described configuration, separate materials have to be used to manufacture the illumination unit, wherein the garnish body and different surface treatment methods have to be applied respectively.

However, due to the garnish body and the illumination unit being separate, a disadvantageous structure exists in producing an illumination effect wherein the whole structure may be changed.

Moreover, since the illumination unit and the garnish body are manufactured separately and are assembled at different locations, a specific pattern of the exterior of the garnish body cannot be realized at the same location of the illumination unit, making it difficult for the two pieces to provide a luxurious image.

SUMMARY OF THE DISCLOSURE

The present invention solves the above-described problems associated with the prior art. Specifically, it is an object of the present invention to provide a luminous garnish for a vehicle in which an illumination unit and a light emitting unit forms an integral part to minimize a surface treating process and to unify a surface treatment and a surface material.

It is another object of the present invention to provide a luminous garnish for a vehicle that provides various patterns and illuminations at a same portion of an integral part, thereby realizing the luxury and high product value of the interior material.

In one aspect, the present invention provides a luminous garnish for a vehicle comprising: a) a garnish body provided as a surface member exposed to an exterior wherein the garnish body is formed of a light transmitting material, b) a light transmitting film having various colors and patterns being inserted onto a surface of the exterior thereof; and c) a surface-emitting illumination unit integrally attached to and assembled in an inner surface of the garnish body so that light can be emitted to the inner surface of the garnish body.

In one embodiment, the garnish body may be made of a light transmitting ABS or a light emitting mixed material of ABS and PC (Polycarbonate).

In another embodiment, a portion of the garnish body through which the light of the surface-emitting illumination unit may be transmitted such that it is luminous is thinner than the other portions of the garnish body.

In certain embodiments, the thickness of the portion of the garnish body through which the light of the surface-emitting illumination unit is transmitted such that it is luminous may be about 0.5 mm to about 2 mm.

In a further embodiment, a printed layer having various colors and patterns is bonded to a light transmitting backing sheet or a deposition layer may be formed on a light transmitting backing sheet and a top film layer may be stacked on the printed layer or deposition layer.

In one embodiment, the backing sheet may be made of a transparent ABS material.

In another further embodiment, a surface coating layer may be additionally stacked on the top film layer.

In other embodiments, the surface-emitting illumination unit may include: a light source; a wave guide plate which the light of the light source enters and is configured to uniformly diffuse the light and emit the light to the inner surface of the garnish body through a front surface thereof; a reflective film attached to a rear surface of the wave guide plate; a clear lens disposed on the front surface of the wave guide plate; and a light leakage preventing case configured to preventing the light attached and fixed to the inner surface of the garnish body from emitting to the outside with the light source, the wave guide plate, the reflective film, and the clear lens being received therein.

In various embodiments, the invention further comprises a masking tape portion which is attached to a front surface of the lens or the front surface of the wave guide plate, which is removed to form the shape of a letter, a figure, or a line, such that the light is transmitted through the removed portion of the masking tape to perform letter/figure emission or line emission.

In certain embodiments, the light source may be an LED which is turned on or off together with headlights or rear lights, or is turned on or off by manipulation of a switch wherein the switch is a door switch using a lighting circuit.

In other embodiments, the invention provides a garnish wherein, various illuminations in the form of surface emission, line emission, a letter or a figure is enabled by selectively turning on the light source, a specific pattern and a specific color can be realized together with the illumination, a luxurious interior can be created by the interior illumination effect, and a high quality of the interior material can be achieved.

In a further embodiment, since an integrated part in which the illumination unit is integrally mounted to the inner surface of the garnish body emits light, a pattern, a color, and an illumination can be realized at an integral part in which the garnish body and the illumination unit are integrally assembled.

Furthermore, since the images realized at the same portion during the day and at night are different (an insert film pattern and a color is realized during the day and a mood/indirect illumination is realized at night), illumination is enabled at a portion of the part, and an illumination color and an illumination type (line emission, surface emission, a letter, a figure, and a pattern can be enabled) of the light source, and a pattern and a color of the insert film, and a gloss can be variously combined, various images and designs can be realized, and the appearance and decoration of the garnish is enhanced, and the product value and high quality of the garnish is improved.

The invention provides an advantage over the current state of the art at least for the following reason: since the garnish is formed of an integral part such that a pattern, a color, and illumination are enabled at the same portion of the garnish and the illumination unit is located on the inner side of the garnish body such that only the garnish body is exposed to the outside, a surface treating process is minimized (a separate surface treatment for realizing indirect illumination is unnecessary) and the surface treatment and the surface material can be unified.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION

Hereinafter, exemplary embodiments of the present invention will be described below in detail with reference to the accompanying drawings such that those skilled in the art to which the present invention pertains can easily practice the present invention.

The present invention relates to a film insert type luminous garnish for a vehicle that realizes both a pattern and an indirect illumination effect in the form of an integrated part having a single exterior surface, by inserting a film having a specific pattern and a specific color onto a surface of an exposed garnish body, and providing an illumination unit performing surface-emitting illumination such that the light emitted from the illumination unit performs delicate illumination while transmitting the garnish body.

Figure 1:
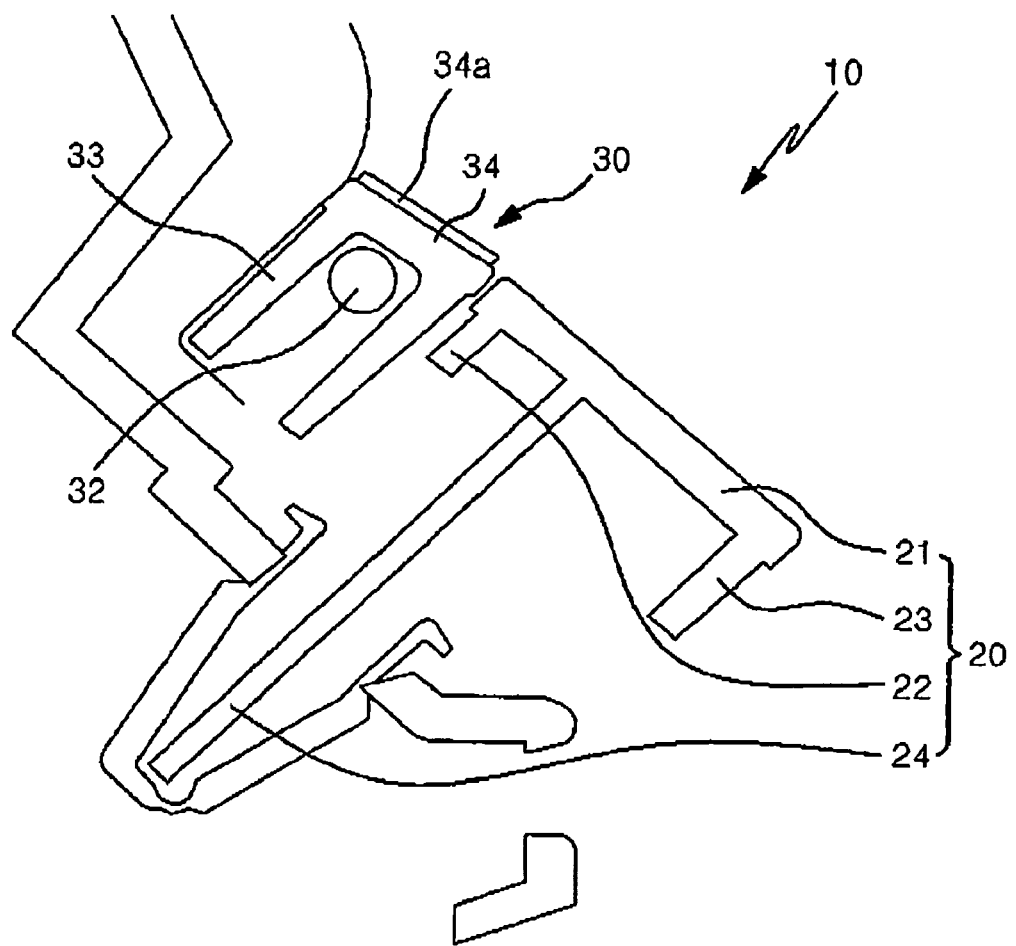
FIG. 1 is a sectional view illustrating an example of a conventional light emitting garnish.
Figure 2:
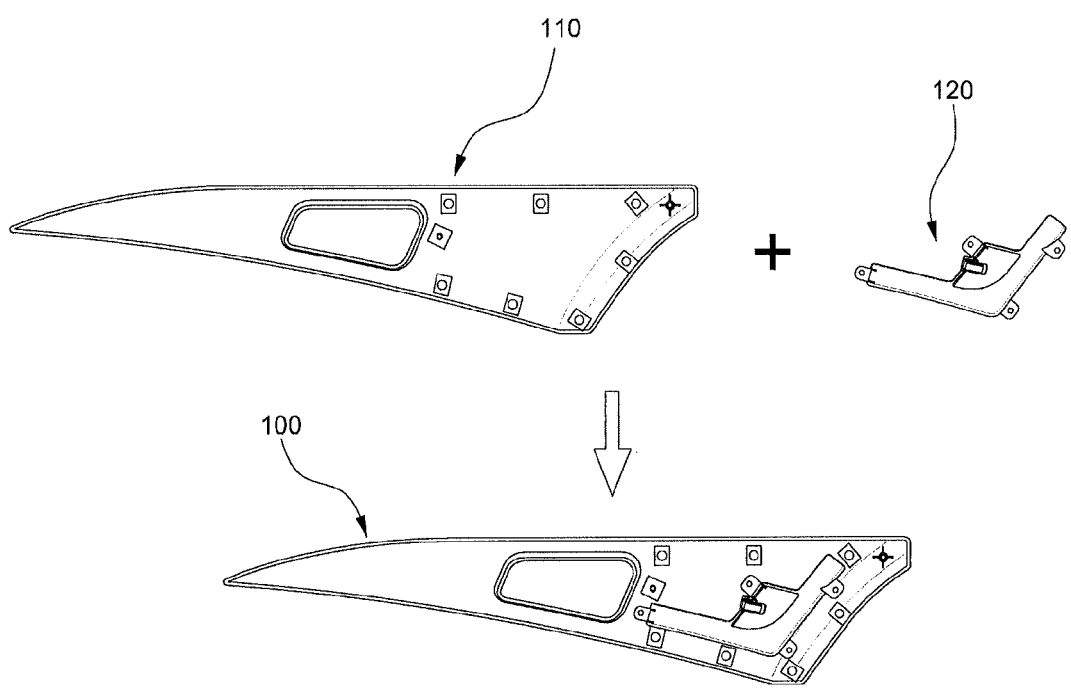
FIG. 2 is a view illustrating a garnish according to an embodiment of the present invention.
Figure 3:
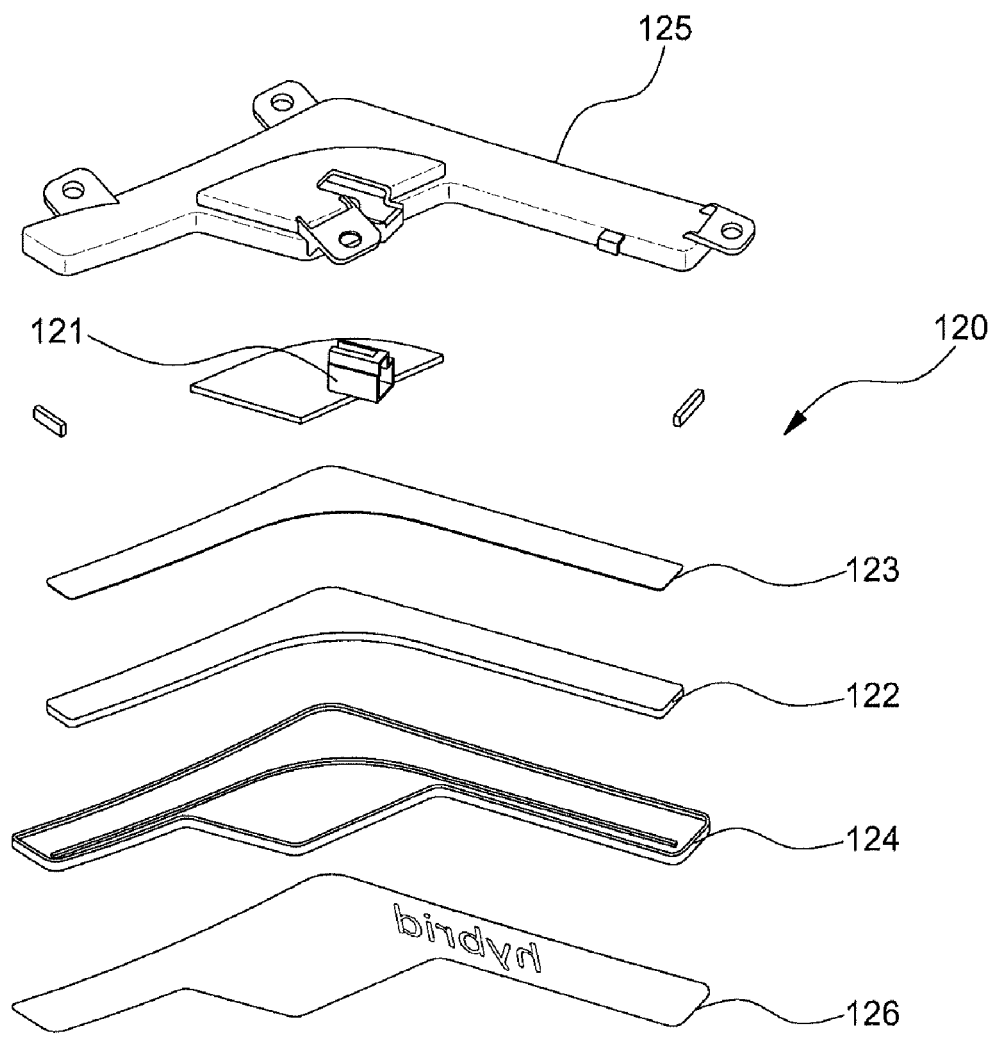
FIG. 3 is an exploded perspective view illustrating an illumination unit of the garnish according to an embodiment of the present invention.

FIG. 2 is a view illustrating a garnish 100 according to an embodiment of the present invention. FIG. 2 illustrates an example of a door garnish, particularly an inner surface of the garnish 100 and an illumination unit 120 mounted to it.

The garnish 100 of the present invention may be an instrument garnish, a crash pad garnish, a console garnish, and other vehicular garnishes attached to various trims, as well as the exemplified door garnish.

Figure 4:
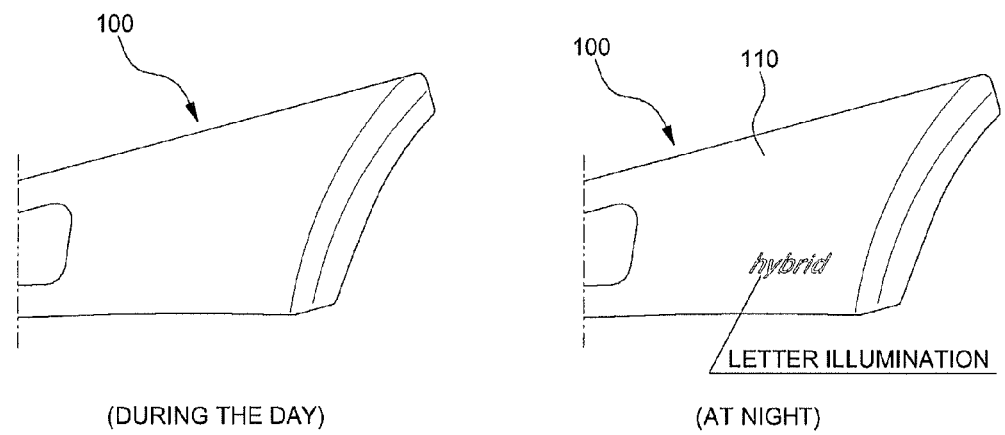
FIG. 4 illustrates the exteriors of the garnish according to an embodiment of the present invention during the day and at night.

FIG. 4 illustrates the exteriors of the garnish according to an embodiment of the present invention during the day and at night. The left and right views of FIG. 4 respectively illustrate a light emitting state during the day and at night.

Figure 5:
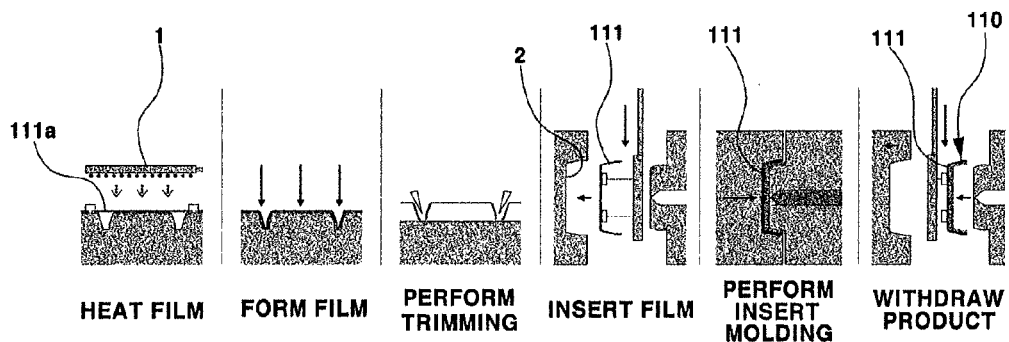
FIG. 5 illustrates a process of manufacturing a garnish body according to an embodiment of the present invention.
Figure 6:
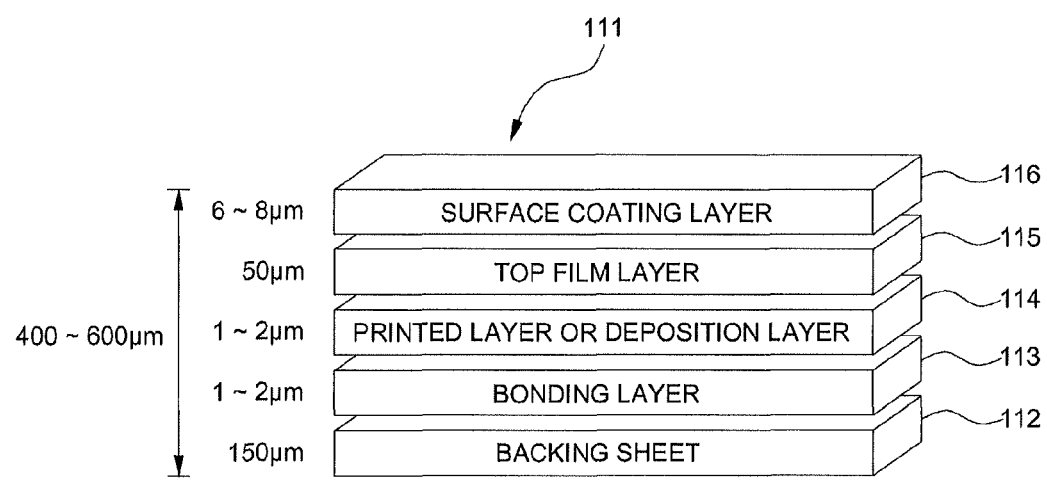
FIG. 6 is a view illustrating a stacked structure of an insert film used in an embodiment of the present invention.

FIG. 5 illustrates a process of manufacturing a garnish body 110 according to an embodiment of the present invention and illustrates a film insert injection molding process. d FIG. 6 is a view illustrating a stacked structure of an insert film 111 used in an embodiment of the present invention.

First, the garnish 100, which is an interior decoration part and an embedded part of a vehicle, includes a garnish body 110 that is a surface member exposed to the exterior and a surface-emitting illumination unit 120 integrally attached to a rear surface, i.e. an inner surface of the garnish body 110.

In manufacturing the garnish body 110, a film 111 made of a light transmitting material and having various patterns and colors is formed in a desired shape with it being inserted and may be manufactured in a film insert injection molding process using a mold.

In particular, the insert film 111 used in the garnish body 110 shows a delicate illumination effect (indirectly illumination effect in the form of a color, a pattern, letter/figure emission, line emission, and surface emission) using the light emitted from the illumination unit 120 and transmitted through the insert film 111, and a light transmitting film is used as the insert film 111.

The material of the garnish body 110 onto which the film 111 is insert is a material having a heat-resisting property, a crashworthy property, and a bending resiliency which are as high as or higher than those of a conventional material, and a transparent or semitransparent material having an excellent light transmitting property is used for the film 111.

Accordingly, a light transmitting film having the structure of FIG. 6 may be used as the insert film 111. The light transmitting film is a surface treatment film made of a light transmitting material and has a structure formed by forming a printed layer having various colors and patterns, or a deposition layer 114 on a light transmitting backing sheet 112 and sequentially stacking a top film layer 115 and a surface coating layer 116 on the printed layer or the deposition layer 114.

The backing sheet 112 is bonded to the garnish body 110. The backing sheet 112 may be made of a transparent ABS material so as to transmit light, and the bonding layer 113 may be formed by applying an acryl or urethane adhesive which is well known in the art.

The printed layer or the deposition layer 114 is a well known printed or deposited layer to realize a specific pattern or a specific color such as wood, metallic, and hi-glossy. For example, a gravure printing method may be used, and a well-known thin film deposition method such as CVD for forming a metal thin film on a surface may be used as the deposition method.

Here, since the deposition layer has a very thin thickness of, for example, 1 to 2 μm, it transmits light without causing any problem and a metal thin film may be deposited on a specific portion using a masking member during deposition of a thin film.

The top film layer 115 formed of PMMA, PU, etc. may be stacked on the printed layer or the deposition layer 114, and a surface coating layer 116 may be stacked on the top film layer 115 and may be formed of an acryl material generally used in film coating.

The surface coating layer 116 is a layer stacked to improve the properties such as gloss and wear, and is optional.

The insert film 111 provides exterior patterns and colors during the day and provides patterns and colors at a specific portion by the light emitted from the turned on illumination unit 120 and also provides letters, figures, line-emitting illumination, and surface-emitting illumination.

The garnish body 110 onto which the film 111 is inserted is formed by a film insert injection molding process of inserting a film into a mold, closing the mold, and injecting a resin, and may be made of a light transmitting plastic material such as ABS (transparent ABS or ABS natural resin) or a mixed material of ABS and PC.

A portion of the garnish body 110 through which the light of the illumination unit 120 is transmitted such that it is luminous and thinner than the other portions of the garnish body 110, and if the portion of the garnish body 110 is a specific portion, the thickness of the specific portion may be optimized to transmit light well.

That is, only the light emitting portion of the garnish body 110 to which the illumination unit 120 is attached during an injection molding process may be thin, and the brightness of light may be adjusted by regulating the thickness.

For example, the thickness of the light emitting portion of the garnish body 110 may be preferably 0.5 to 2 mm. If the thickness of the portion is less than 0.5 mm, it may be broken, and if the thickness of the portion is more than 2 mm, transmission of light may be blocked, which are not preferable.

The manufacturing process of the garnish body 110 is as illustrated in FIG. 5. As illustrated, after a transparent backing sheet is attached and an insert film raw material 111a on which a desired pattern and a color are printed, a desired shape is formed by heating it with a heating unit 1 and vacuuming it and an unnecessary portion is removed by trimming it.

Then, after the molding insert film 111 is inserted into an injection mold 2 and a resin is injected to form the garnish body 110, the garnish body 110 is withdrawn from the mold 2 to finish the garnish body 110, with the film 111 being inserted onto a surface of the garnish body 110.

Meanwhile, the garnish 100 is finished by attaching the illumination unit 120 to the inner surface of the garnish body 110, and a surface-emitting illumination unit that can uniformly emit light to a specific or the whole portion of the garnish body 110 is used as the illumination unit 120.

The illumination unit 120 may include: a light source 121, a wave guide plate 122 which the light of the light source 121 enters and configured to uniformly diffuse the light and emit the light to the inner surface of the garnish body 110 through a front surface thereof, a reflective film 123 attached to a rear surface of the wave guide plate 122, a clear lens 124 disposed on the front surface of the wave guide plate 111, and a light leakage preventing case 125 configured to preventing the light attached and fixed to the inner surface of the garnish body 110 from emitting to the outside with the light source 121, the wave guide plate 122, the reflective film 123, and the clear lens 124 being received therein.

Here, an LED that can emit light with various colors (red/blue/white etc.) may be used as the light source 121, and may be turned on when headlights or rear lamps which are generally turned on at night are turned on.

That is, when a driver turns on headlights and rear lamps by manipulating a multifunction switch, power is supplied to the light source 121 simultaneously with a circuit.

The turning circuit of the light source 121 may be operated in conjunction with a door switch such that the door garnish 100 is turned on when the door is opened and the light source 121 may be turned on by a certain manipulation in the vehicle, in which case the turning manipulation, time, and condition of the light source 121 are not specifically limited.

The configuration of the turning circuit which turns on the light source as the driver manipulates the switch, is well known in the art.

The wave guide plate 122 is a medium that uniformly diffuses the light from the light source 121 and may be formed of PC (Polycarbonate). The wave guide plate 122 enables a large-scale surface-emitting effect according to its design.

The reflective film 123 is an attached film configured to reflect the light emitting from the wave guide plate 122 and to enhance the light-emitting performance of the wave guide plate 122. The clear lens 124 may be formed of PC (polycarbonate) and directly contacts the garnish body 110 so as to protect the wave guide plate 122.

The light leakage preventing case 125 is a cover structure configured to prevent leakage of light emitted from the wave guide plate 122, and surrounds the light source 121, the wave guide plate 122, the reflective film 123, and the clear lens 124, to prevent leakage of light. The light leakage preventing case 125 is attached and fixed to the inner surface of the garnish body 110 using screws, with the light source 121, the wave guide plate 122, the reflective film 123, and the clear lens 124 being received therein (see FIG. 2).

When the light leakage preventing case 125 is absent, light can be leaked between the elements after mounting and assembling the elements. Thus, it is a preferred embodiment to install a light leakage preventing case for shielding light. The light leakage preventing case 125 may be made of black PC.

When the surface-emitting illumination unit 120 is attached to the inner surface of the garnish body 110 and the light source 121 is turned on, the light of the light source 121 is uniformly dispersed through the wave guide plate 122 to be irradiated to the garnish body 110. The light shows a delicate illumination effect while passing through the garnish body 110, creating a luxurious atmosphere in the interior of the vehicle.

The exterior illumination of the garnish created by the light passing through the garnish body 110 is a type of surface-emitting illumination.

In a preferred embodiment of the present invention, a masking tape 126, a portion of which is removed to form the shape of a letter, a figure, or a line, may be attached to a front surface of the lens 124 or the front surface of the wave guide plate 122. In this case, since the light is transmitted only through the removed portion of the masking tape 126, illumination in the form of a letter, figure, and a line is possible instead of surface-emitting illumination.

That is, light can be transmitted only through a specific portion of the masking tape 126, and illumination in the form of a letter, a figure, or a line is achieved as seen from the exterior of the garnish 100 attached to the vehicle.

FIG. 4 illustrates the garnish 100 creating illumination in the form of a letter using a masking tape 126 whose portions are removed in the form of a letter ('hybrid"). Then, the light is selectively transmitted by the masking tape 126 with the light source 121 being turned on, creating illumination in the form of a letter.

In the garnish 100, a specific pattern (wood, metallic, hi-glossy, etc.) realized by the insert film 111 on the exterior of the garnish body 110 can be shown during the day, and the appearance of the garnish body 110 is realized by the insert film at the light emitted body by turning on the light source 121, and illumination in the form of a letter, a figure, or a line can be achieved by surface emission or masking tape 126.

According to the garnish 100 of the present invention, various illuminations in the form of surface emission, line emission, a letter or a figure is enabled by selectively turning on the light source 121, and a specific pattern and a specific color can be realized together with the illumination. Thus, a luxurious interior can be created by the interior illumination effect, and a high quality of the interior material can be achieved.

Further, since an integrated part (in which the illumination unit 120 is integrally mounted to the inner surface of the garnish body 110) emits light, a pattern, or a color, an illumination can be realized at an integral part in which the garnish body 110 and the illumination unit 120 are integrally assembled.

Furthermore, since the images realized at the same portion during the day and at night are different (an insert film pattern and a color is realized during the day and a mood/indirect illumination is realized at night), illumination is enabled at a portion of the part, and an illumination color and an illumination type (line emission, surface emission, a letter, a figure, and a pattern can be enabled) of the light source 121, and a pattern and a color of the insert film 111, and a gloss can be variously combined. Various images and designs can be realized, and the appearance and decoration of the garnish 100 is enhanced, and the product value and high quality of the garnish 100 is improved.

In particular, since the garnish 110 is formed of an integral part such that a pattern, a color, and illumination are enabled at the same portion of the garnish 110, and the illumination unit 120 is located on the inner side of the garnish body 110 such that only the garnish body is exposed to the outside, a surface treating process is minimized (a separate surface treatment for realizing indirect illumination is unnecessary) and the surface treatment and the surface material can be unified.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A luminous garnish for a vehicle comprising:
   a) a garnish body provided as a surface member exposed to an exterior, wherein the garnish body is formed of a light transmitting material,
   b) a light transmitting film having various colors and patterns being inserted onto a surface of the exterior thereof, and
   c) a surface-emitting illumination unit integrally attached to and assembled in an inner surface of the garnish body so that light can be emitted to the inner surface of the garnish body,
   wherein the surface-emitting illumination unit includes:
   a light source;
   a wave guide plate which the light of the light source enters and is configured to uniformly diffuse the light and emit the light to the inner surface of the garnish body through a front surface thereof;
   a reflective film attached to a rear surface of the wave guide plate;
   a clear lens disposed on the front surface of the wave guide plate; and
   a light leakage preventing case configured to preventing the light attached and fixed to the inner surface of the garnish body from emitting to the outside,
   and wherein a masking tape a portion which is attached to a front surface of the lens or the front surface of the wave guide plate, which may be removed to form the shape of a letter, a figure, or a line, such that the light is transmitted through the removed portion of the masking tape to perform letter/figure emission or line emission.

2. The luminous garnish of claim 1, wherein the garnish body is made of a light transmitting ABS or a light emitting mixed material of ABS and PC (Polycarbonate).

3. The luminous garnish of claim 1, wherein a portion of the garnish body through which the light of the surface-emitting illumination unit is transmitted such that it is luminous, is thinner than the other portions of the garnish body.

4. The luminous garnish of any one of claims 1 to 3, wherein the thickness of the portion of the garnish body through which the light of the surface-emitting illumination unit is transmitted such that it is luminous, is about 0.5 mm to about 2 mm.

5. The luminous garnish of claim 1, wherein a printed layer having various colors and patterns is bonded to a light transmitting backing sheet or a deposition layer is formed on a light transmitting backing sheet; and a top film layer is stacked on the printed layer or deposition layer.

6. The luminous garnish of claim 5, wherein the backing sheet is made of a transparent ABS material.

7. The luminous garnish of claim 5, further comprising a surface coating layer that is additionally stacked on the top film layer.

8. The luminous garnish of claim 1, wherein the light source is an LED which is turned on or off together with headlights or rear lights, or is turned on or off by manipulation of a switch, wherein the switch is a door switch using a lighting circuit.

* * * * *